United States Patent
Hallowell (10) Patent No.: US 9,789,440 B2
(45) Date of Patent: Oct. 17, 2017

(54) COMBINED CATALYTIC CONVERTER AND CYCLONIC SEPARATOR FOR BIOFUEL-FIRED FURNACE

(71) Applicant: Jeffrey R. Hallowell, Woodstock, CT (US)

(72) Inventor: Jeffrey R. Hallowell, Woodstock, CT (US)

(*) Notice: Subject to any disclaimer, the term of this patent is extended or adjusted under 35 U.S.C. 154(b) by 269 days.

(21) Appl. No.: 14/886,516

(22) Filed: Oct. 19, 2015

(65) Prior Publication Data

US 2016/0107120 A1    Apr. 21, 2016

Related U.S. Application Data

(60) Provisional application No. 62/065,810, filed on Oct. 20, 2014.

(51) Int. Cl.
  *B01D 53/86*   (2006.01)

(52) U.S. Cl.
  CPC ....... *B01D 53/8696* (2013.01); *B01D 53/864* (2013.01); *B01D 2257/708* (2013.01)

(58) Field of Classification Search
  None
  See application file for complete search history.

(56) References Cited

U.S. PATENT DOCUMENTS

| 2005/0022553 A1 | 2/2005 | Abrams et al. ................ 62/617 |
| 2005/0201914 A1* | 9/2005 | Ritzenthaler .......... B01D 53/40 423/230 |
| 2010/0104482 A1 | 4/2010 | Morin et al. ................. 422/142 |
| 2010/0275781 A1 | 11/2010 | Tsangaris et al. ............. 96/108 |
| 2011/0008214 A1 | 1/2011 | Haas et al. ................... 422/105 |

FOREIGN PATENT DOCUMENTS

WO    WO 2012/061795    5/2012    ............. G05D 23/00

OTHER PUBLICATIONS

Korean Intellectual Property Office, International Search Report, International Application No. PCT/US2015/056182, together with the Written Opinion of the International Searching Authority, 14 pages, Dec. 18, 2015.
Wikipedia, "Cyclonic separation," https://en.wikipedia.org/w/index.php?title=Cyclonic_separation&oldid=621523223, Aug. 16, 2014, 5 pages.
Wikipedia, "Particulates," https://en.wikipedia.org/w/index.php?title=Particulates&oldid=626469853, Sep. 21, 2014, 11 pages.

* cited by examiner

*Primary Examiner* — Walter D Griffin
*Assistant Examiner* — Jelitza Perez
(74) *Attorney, Agent, or Firm* — Sunstein Kann Murphy & Timbers LLP (57) ABSTRACT

A pollution reduction system includes a catalytic converter, fabric filtration and a plurality of cyclonic separators to effectively reduce CO, VOCs and particulate matter emissions from biomass fuel-fired furnaces, while efficiently extracting heat from exhaust gas.

10 Claims, 8 Drawing Sheets

COMBINED CATALYTIC CONVERTER AND CYCLONIC SEPARATOR FOR BIOFUEL-FIRED FURNACE

CROSS REFERENCE TO RELATED APPLICATIONS

This application claims the benefit of U.S. Provisional Patent Application No. 62/065,810, filed Oct. 20, 2014, titled "Combined Catalytic Converter and Cyclonic Separator for Biofuel-Fired Furnace," the entire contents of which are hereby incorporated by reference herein, for all purposes.

TECHNICAL FIELD

The present invention relates to pollution control apparatus for bio-fuel fired devices and, more particularly, to combined catalytic converter and cyclonic separator pollution control apparatus.

BACKGROUND ART

As the price of fossil fuels rises, many small businesses and other users of heating devices have turned to less expensive renewable energy alternatives, such as biomass (biofuel)-fired heating equipment. Unfortunately, complete combustion rarely occurs in this type of equipment. Consequently, biomass-fired heating equipment often is a significant source of particulate matter (PM), carbon monoxide (CO) and volatile organic carbons (VOCs).

In addition to carbon dioxide, nitrogen and water that are released by complete combustion of biomass, incomplete combustion produces various inorganic gases, such as carbon monoxide, ozone and nitrogen oxides, as well as polycyclic aromatic hydrocarbons (PAHs), benzene, aldehydes, free radicals and inhalable particulate matter (PM), all of which have been shown to negatively impact human health. While smoke from biomass units is known to contain a number of compounds that are toxic and/or carcinogenic to humans, one of the pollutants of greatest concern is biomass derived particulate matter.

According to United States Environmental Protection Agency (EPA) particulate matter emissions estimates from 2011, biomass combustion products account for about 2.5% of all U.S. national emissions having diameters smaller than about 10 microns ($\mu m$) and 8.1% of all U.S. national emissions having diameters smaller than about 2.5 microns. It is important to note, however, that in some communities, biomass combustion's contribution to ambient particulate matter levels is even more significant, with levels as high as about 42-56%. Inasmuch as about 70% of indoor particulate matter comes from outside sources, biomass-derived particulate matter can quickly become an indoor air problem.

Particulate matter begins to effect health when particles smaller than about 10 microns (PM10) are inhaled, as these particles can bypass natural filtration systems present in human noses and respiratory tracts. Particles smaller than about 2.5 microns (PM2.5), and especially particles smaller than about 0.1 microns (PM0.1), are of great concern, because these particles are small enough to enter alveoli of the lungs and travel into the blood stream. While particulate matter itself can do structural damage to lungs, a major concern is other substances, specifically carcinogenic or toxic compounds, that these particles can carry into an individual's lungs and blood stream, including free radicals, hydrocarbons, such as PAHs, benzene and styrene, as well as aldehydes and phenols. Notably, diameters of particulate matter released during biomass fuel combustion peak at about 0.1-0.2 micron, with a majority of all particulate matter less than 1 micron in diameter.

In addition to its toxic and carcinogenic effects, short-term particulate matter exposure can lead to increased heart attacks, increased hospitalizations for cardiovascular disease, increased mortality, decreased lung function and increased hospitalizations for asthma and respiratory causes among children. Long-term exposure to particulate matter has been associated with higher rates of lung cancer, cardiovascular disease and mortality, as well as decreased life expectancy. The state of Washington estimates that US$190 million was spent each year recently on health expenditures due to particulate matter exposure, with national estimates in the billions of dollars. Globally, the World Health Organization (WHO) estimates that particulate matter exposure is responsible for nearly 800,000 premature deaths. It is important to note, however, that these studies looked at particulate matter from all sources, and that the premature deaths, morbidities and associated costs incurred from biomass combustion emissions from commercial sources would be proportional to their contribution to national particulate matter levels.

The EPA currently has national emission regulations in place for biomass fired heating units that have firebox volumes not exceeding 20 cubic feet, air-to-fuel ratios of less than 35:1, burn rates less than 5 kilograms per hour and total unit weights not exceeding 80 kilograms. Unfortunately, many units that are used commercially exceed these size parameters and are, therefore, exempt from these emission standards. In 2007, a voluntary emissions program was implemented by the EPA to begin to regulate these larger commercial heating units. However, as of 2013, only ten states have adopted the suggested emission requirements. While these regulations are voluntary, it is important to note that these emission regulations only apply to newly installed biomass fired heating equipment. They do not apply to a large installed base of existing units.

EPA regulations limit the amount of particulate matter, measured in grams per hour, that may be emitted by biofuel-fired heating devices, such as stoves, furnaces, boilers, kilns, roasters and other devices that are fueled by stick wood, wood pellets, grass pellets, wood chips or other bio-solids. Particulate matter is typically produced due to incomplete combustion of fuel. There is, therefore, a need to improve combustion efficiency. Such improvements in efficiency typically lead to decreases in the amount of particulate matter produced per unit of heat generated and increase the amount of heat generated per unit of fuel consumed.

SUMMARY OF EMBODIMENTS

An embodiment of the present invention provides a pollution control system for coupling to an exhaust gas outlet port of a biomass furnace. The pollution control system may be configured so as to be retrofitted to the biomass furnace. Alternatively, the pollution control system may be part of the biomass furnace.

The pollution control system includes an exhaust gas inlet port, which may be coupled to the exhaust gas outlet port of the biomass furnace. A catalytic converter is communicably coupled to the exhaust gas inlet port. An electric heater is disposed proximate the catalytic converter. A temperature sensor is disposed proximate the catalytic converter to measure a temperature of the catalytic converter or at least approximate the temperature of the catalytic converter. A controller is coupled to the temperature sensor and receives a first signal from the temperature sensor. The first signal is indicative of a temperature proximate the catalytic converter. The controller automatically generates a second signal that causes operation of the electric heater when the temperature proximate the catalytic converter is less than a predetermined value, whenever the pollution control system is operational. The pollution control system may be made operational by a user-controlled switch, a sensor that detects when the biomass furnace operates or is being prepared for operation, a room thermostat or another circuit that generates a call for heat signal.

The pollution control system also includes a first cyclonic separator communicably coupled to an output of the catalytic converter and a second cyclonic separator. A first fabric filter is communicably coupled between an output of the first cyclonic separator and an input of the second cyclonic separator. An exhaust gas outlet port is communicably coupled to an output of the second cyclonic separator.

The pollution control system also includes a motor-driven fan communicably coupled between an output of the second cyclonic separator and the exhaust gas outlet port. The fan causes exhaust gas to flow sequentially, from the exhaust gas inlet port, through the catalytic converter, the first cyclonic separator, the first fabric filter, the second cyclonic separator and then the exhaust gas outlet port, in that order, thereby defining an exhaust gas path.

The pollution control system may also include a pressure sensor disposed within the exhaust gas path and/or a flow rate sensor disposed within the exhaust gas path. A controller (such as the aforementioned controller or a separate controller) may be coupled to the pressure sensor and/or to the flow rate sensor. The controller may receive a first signal from the pressure sensor and/or to the flow rate sensor. The controller may automatically generate a second signal that controls speed of the motor-driven fan, based at least in part on the first signal.

The pollution control system may also include an air channel communicably coupled between an outside of the pollution control system and the catalytic converter. The air channel may include a heat exchanger thermally coupled to the exhaust gas path. The air channel delivers air from outside the pollution control system, heated by the heat exchanger, to the catalytic converter.

The pollution control system may also include at least one thermal mass brick. The brick may be proximate, and thermally coupled to, the catalytic converter and the first cyclonic separator. The at least one thermal mass brick may be positioned to absorb heat from the first cyclonic separator. The at least one thermal mass brick may store the heat. The at least one thermal mass brick may radiate and/or conduct the stored heat toward the catalytic converter.

The at least one thermal mass brick may include at least three thermal mass bricks stacked vertically parallel to the first cyclonic separator.

The pollution control system may also include a user-removable particulate matter receptacle. The receptacle may have an input port. The pollution control system may also include a trough having an output port. The trough may define an input area. The trough may slope downward from the input area toward the output port. An input of the first fabric filter may register vertically above at least a respective portion of the input area. The output of the first cyclonic separator may register vertically above at least a respective portion of the input area. The output port of the trough may be in communication with the input port of the particulate matter receptacle.

The first cyclonic separator may be oriented substantially parallel to the second cyclonic separator. An input of the second cyclonic separator may be positioned proximate the output of the first cyclonic separator. Consequently, the exhaust gas flows through the first cyclonic separator in a direction substantially opposite a direction the exhaust gas flows through the second cyclonic separator. This requires the exhaust gas to turn about 180 degrees after exiting the first cyclonic separator to enter the first fabric filter.

The pollution control system may also include a third cyclonic separator and a second fabric filter. The second fabric filter may be communicably coupled between the output of the first cyclonic separator and an input of the third cyclonic separator. The exhaust gas outlet port may be communicably coupled to an output of the third cyclonic separator, as well as to the output of the second cyclonic separator. At least a portion of the exhaust gas path includes the second fabric filter and the third cyclonic separator. The motor-driven fan may cause at least a portion of the exhaust gas to flow sequentially through the second fabric filter and the third cyclonic separator, in that order.

The pollution control system may also include a user-removable particulate matter receptacle and a trough. The particulate matter receptacle may have an input port. The trough may have an output port. The trough may define an input area. The trough may slope downward from the input area toward the output port. An input of the first fabric filter, an input of the second fabric filter and the output of the first cyclonic separator may each register vertically above at least a respective portion of the input area. The output port of the trough may be in communication with the input port of the particulate matter receptacle.

The first cyclonic separator may be oriented substantially parallel to the second cyclonic separator and substantially parallel to the third cyclonic separator. An input of the second cyclonic separator and an input of the third cyclonic separator may each be positioned proximate the output of the first cyclonic separator. Consequently, the exhaust gas may flow through the first cyclonic separator in a direction substantially opposite a direction the exhaust gas flows through the second and third cyclonic separators. As a result, at least a portion of the exhaust gas may be required to turn about 180 degrees after exiting the first cyclonic separator to enter the first fabric filter, and another at least a portion of the exhaust gas may be required to turn about 180 degrees after exiting the first cyclonic separator to enter the second fabric filter.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

In accordance with preferred embodiments of the present invention, methods and apparatus are disclosed for reducing CO, VOCs and particulate matter emissions from biomass fuel-fired furnaces, while efficiently extracting heat from exhaust gas.

Wood or other biomass fuel-fired furnaces are known as good sources of heat, without depending on imported fuel and without burning fossil fuel. However, as noted, particulate matter and harmful gases such as carbon monoxide produced by such devices pose problems, and manually-operated catalytic converters are inadequate to solve these problems.

Biomass fuel here means a fuel that is in some way derived from biomass, including solid biomass fuel, liquid fuels and bio-gases. Biomass, a renewable energy source, is biological material from living, or recently living, organisms, such as wood, waste, algae, (hydrogen) gas and alcohol fuels. Exemplary solid biofuels include wood and wood pellets. Bioethanol is an alcohol made by fermenting sugar components of plant materials; it is made mostly from sugar and starch crops.

Currently, only three types of emission reduction equipment are available to reduce emissions from biomass fired heating devices, i.e., cyclonic separators, "bag houses" (filter fabrics) and catalysts (catalytic converters).

Single-unit and multi-unit cyclonic separators use centrifugal force to remove particulate matter from biomass combustion emissions. As exhaust gas spins in the top of a cyclone chamber, gravitational force on the particulate matter causes it to settle and eventually drop out of the cyclone body into a collection device located below, while "clean" exhaust escapes through the top of the chamber. A single-unit cyclonic separator uses one cyclone body, while a multi-unit cyclonic separator uses multiple smaller cyclones connected in series to improve efficiency. A conventional single-unit cyclonic separator can reduce PM10 emissions by about 50% and PM2.5 emissions by about 5%. A conventional multi-unit cyclonic separator can reduce PM10 emissions by about 75% and PM2.5 emissions by about 10%.

In bag houses, biomass combustion emissions pass through fabric filters to remove particulate matter emissions. Cyclonic separators are more efficient than bag houses at removing course particulate matter, whereas bag houses are more efficient than cyclonic separators at removing fine particulate matter. Because bag house filters work best when not overloaded with particulate matter, bag house units are often run in series after cyclonic separators. Although bag houses can be very effective, reducing both PM10 and PM2.5 emissions by about 99%, they can pose a significant fire hazard. For example, a hot ember can ignite a fabric filter in a bag house. Furthermore, due to their tightly-woven fabric, these filters pose a significant impediment to the flow of exhaust gas, especially when combined with elaborate "plumbing" associated with cyclonic separators.

Unlike other biomass emission reduction technologies, catalytic converters can reduce CO and VOCs, in addition to reducing particulate matter emissions. Each catalytic converter includes a reactive surface. As biomass emissions pass over the reactive surface, CO, VOCs, unburned hydrocarbons and particulate matter are further reduced to carbon dioxide and water. Often, in order to become reactive, these catalysts need to reach an operating temperature and, as such, catalysts are often placed into one of two categories, i.e., active and passive. Passive catalysts use heat from the biomass combustion emissions to heat the catalyst. Consequently, these units can often take an extended period of time to reach operating temperature and, therefore, allow uncontrolled emissions to escape during start-up and refueling periods.

On the other hand, active catalysts, such as those disclosed in U.S. Pat. No. 8,812,162, titled "Intelligently-Controlled Catalytic Converter for Biofuel-Fired Boiler" by John Schneider, et al., the entire contents of which are hereby incorporated by reference, use electric, propane, microwave, infrared or other heaters to warm the catalyst to an activation temperature, such as prior to combustion of biomass fuel. Some embodiments control a heater configured to bring a catalytic converter up to operating temperature, i.e., a catalytic ignition temperature ("activation temperature"), such as between about 350° F. (177° C.) and about 600° F. (316° C.). Some embodiments prevent major, or in some cases any, burning of biomass fuel until the catalytic converter reaches the operating temperature. For example, some embodiments prevent opening a damper or operating a fan that permits air to enter a fire box until the catalytic converter reaches the operating temperature. Some embodiments prevent ignition of a fire in the fire box or other burning apparatus until the catalytic converter reaches the operating temperature.

Active catalysts can, therefore, continuously control biomass emission levels, even during startup and refueling. Carefully designed catalytic converters are very effective at reducing CO and VOC emissions. Some studies have documented catalytic reduction of CO and VOC levels by about 95% and 80%, respectively.

While an active catalyst can significantly reduce CO and VOC emissions, a catalytic converter is less adept at removing particulates. Embodiments of the present invention combine an active catalytic converter with a single-unit or a multi-unit cyclonic separator, optionally including a bag house, to reduce both particulate matter and CO and VOC emissions. In some embodiments, the components are configured to improve heat extraction from exhaust gas.

Figure 1:
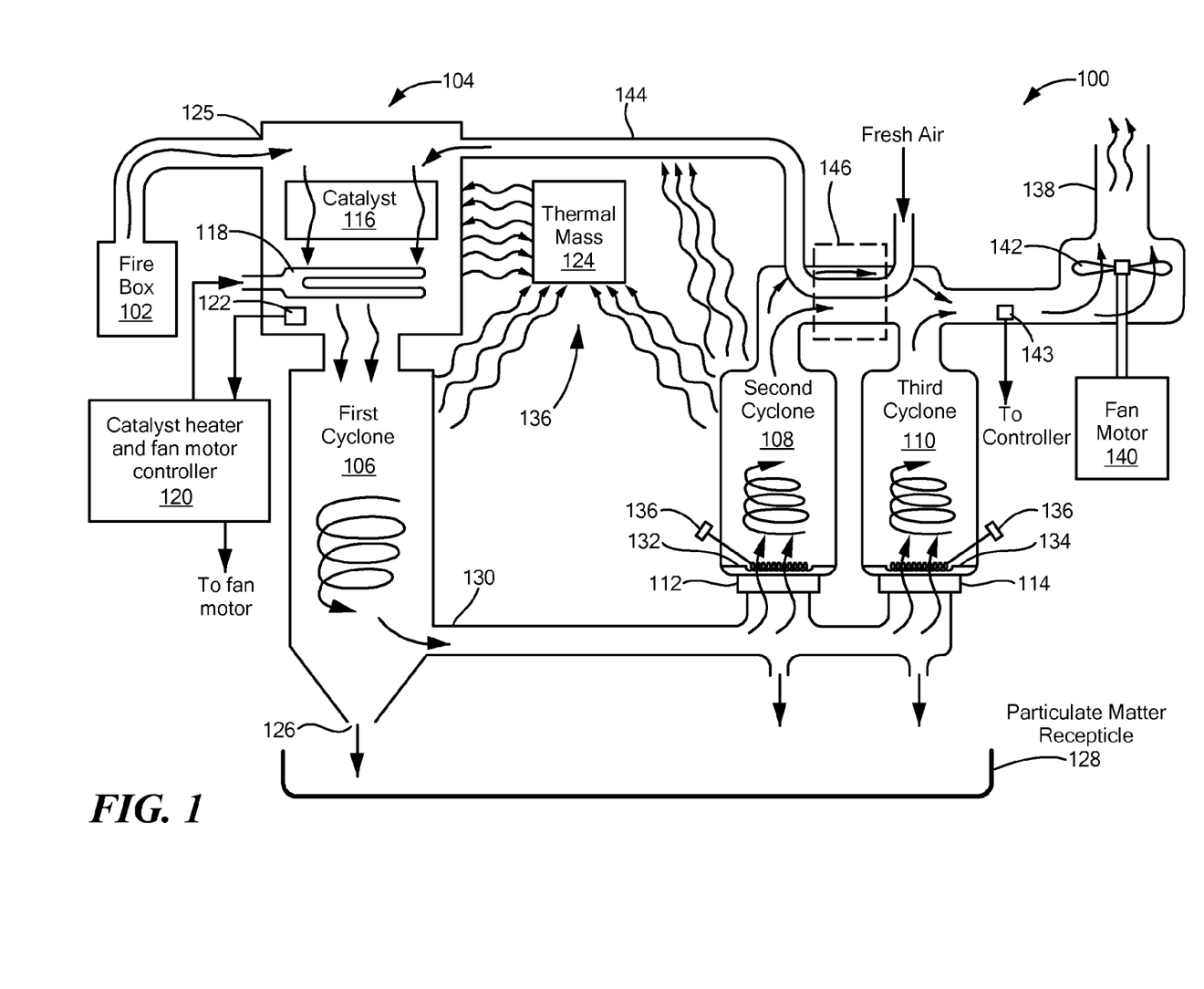
FIG. 1 is a schematic diagram of a pollution reduction system, according to an embodiment of the present invention.

FIG. 1 is a schematic diagram of a pollution reduction system 100, according to an embodiment of the present invention. The system 100 shown in FIG. 1 may be configured as a self-contained unit that may be retrofitted to a wood stove or other biomass furnace, represented by a fire box 102. Alternatively, a biomass furnace may be fabricated with an integrated pollution reduction system 100. The pollution control system 100 includes an active catalytic converter 104, multiple cyclonic separators, here represented by three cyclonic separators 106, 108 and 110, and multiple fabric filters (bag house filters), here represented by fabric filters 112 and 114. Although the system 100 is shown with three cyclonic separators 106, 108 and 110 and two fabric filters 112 and 114, other numbers of cyclonic separators and other numbers of fabric filters may be included.

The active catalyst 104 includes a catalytic converter 116 and an electric catalyst heater 118. A catalyst heater controller 120 receives signals from a temperature sensor 122 proximate the catalytic converter 104 and controls operation of the electric catalyst heater 118, largely as described in the above-referenced U.S. Pat. No. 8,812,162 and summarized herein. Optionally or alternatively, the catalyst heater 118 may be powered by another energy source, such as propane gas or liquid fuel.

The pollution control system 100 is configured to efficiently extract heat from exhaust gas generated in the fire box 102, in addition to reduce CO, VOC and particulate matter emissions. Heat extracted from the exhaust gas may be used to heat a space, such as a room or a house or, with addition of appropriate heat transfer apparatus, such as a water jacket, the extracted heat may be used to provide domestic hot water and/or to feed remote radiators. The pollution control system 100 is also configured to store, in a thermal mass 124, some heat generated by the catalyst 116 while the catalytic converter 104 is operating and later use the stored heat to warm the catalyst 116, such as after the catalytic converter 104 has been idle. Thus, the pollution control system 100 includes a heat "battery" (storage unit) that reduces the need to operate the electric catalyst heater 118.

The pollution control system 100 includes an exhaust gas inlet port 125, by which it may be coupled to the fire box 102 to receive exhaust gas. An inlet of the catalytic converter 104 is coupled to the exhaust gas inlet port 125. After undergoing catalytic conversion, the exhaust gas exits the catalytic converter 104 and enters the first cyclonic separator 106. The first cyclonic separator 106 causes the exhaust gas to follow a helical path, which forces particulate matter radially outward, toward the wall of the cyclonic separator 106, thereby extracting at least some of the particulate matter from the exhaust gas and depositing the extracted particulate matter, via a particulate matter exit port 126, into a particulate matter receptacle 128. The exhaust gas leaves the first cyclonic separator 106 via an output 130 and travels to inputs of the first and second fabric filters 112 and 114. The exhaust gas following the helical path within the first cyclonic separator 106 enhances heat transfer from the exhaust gas to the wall of the first cyclonic separator 106, which are made of a relatively high heat constant material, such as steel.

Exhaust gas that travels through the first fabric filter 112 enters the second cyclonic separator 108, and exhaust gas that travels through the second fabric filter 114 enters the third cyclonic separator 110. Some particulate matter caught by the first or second fabric filter 112 or 114 may subsequently fall from the respective filter 112 or 114 into the particulate matter receptacle 128. Optionally, each of the fabric filters 112 and 114 may be equipped with a respective spring 132 and 134 proximate the fabric filter 112 or 114. A handle, exemplified by handle 136, may be mechanically coupled to the spring 132 by a rod or cable. A user pulling and then suddenly releasing the handle 136 causes the spring 132 to strike the fabric filter 112, thereby dislodging at least some of the particulate matter caught by the filter 112. Each fabric filter 112 and 114 may be so equipped for cleaning.

Optionally, electrostatic precipitators (not shown) may be used in place of, or in addition to, one or both the fabric filters 112 and 114.

The second and third cyclonic separators 108 and 110 may be constructed and operate much like the first cyclonic separator 106. However, particulate matter extracted by the second and third cyclonic separators 108 and 110 may simply fall to the bottom of the respective cyclonic separator 108 or 110 and remain there until the respective fabric filter 112 or 114 is removed.

Non-linear exhaust gas flow in the second and third cyclonic separators 108 and 110 increases contact between the exhaust gas and walls of the cyclonic separators 108 and 110, thereby increasing heat transfer from the exhaust gas to the cyclonic separators 108 and 110. A similar increase in heat transfer occurs in the first cyclonic separator 106. The first, second and third cyclonic separators 106, 108 and 110 radiate or conduct heat, as indicated by wavy arrows 136. Similarly, the catalytic converter 104 radiates or conducts heat when it operates. At least some of the heat from the cyclonic separators 106, 108 and 110 and from the catalytic converter 104 is absorbed by the thermal mass brick 124. The thermal mass brick 124 is made of a material, such as a suitable high-temperature ceramic, having a relatively high specific heat capacity and a relatively high density, so the thermal mass brick 124 has a relatively high thermal mass. Ideally, the thermal mass brick 124 has a thermal mass sufficient to store enough heat to raise the temperature of the catalyst 116 from an expected startup temperature, such as ambient temperature, to the catalyst's activation temperature, or at least a significant fraction, such as about one-half, of the catalyst's activation temperature.

Absent the thermal mass brick 124, if the catalytic converter 104 ceases operating, such as due to lack of fuel in the fire box 102 or because a thermostat (not shown) stops calling for heat and, consequently, a fire in the fire box 102 dies down or ceases burning, the catalyst 116 may cool. However, while the catalytic converter 104 is not operating, the thermal mass brick 124 radiates or conducts heat toward the catalyst 116, thereby keeping the catalyst 116 warm for longer than if the thermal mass brick 124 were absent. Similarly, if catalytic action generates excess heat, the thermal mass brick 124 absorbs at least some of the excess heat, helping to prevent the catalyst 116 from overheating. Thus, the thermal mass brick 124 smooths the temperature profile of the catalyst 116 over time.

Outputs of the second and third cyclonic separators 108 and 110 are joined, and exhaust gas exiting the second and third cyclonic separators 108 and 110 exits the pollution control system 100 via an exhaust gas outlet port 138. The exhaust gas outlet port 138 may be coupled to a flue or chimney. Thus, the pollution control system 100 defines an exhaust gas path sequentially through the exhaust gas inlet port 125, the catalytic converter 104, the first cyclonic separator 106, the first fabric filter 112, the second cyclonic separator 108, the second fabric filter 114, the third cyclonic separator 110 and the exhaust gas outlet port 138. Note that the exhaust path forks after the first cyclonic separator 106 and rejoins after the second and third cyclonic separators 108 and 110.

A motor 140 drives a fan 142 disposed within the exhaust gas path causes at least a portion of exhaust gas from the fire box 102 to flow sequentially through the exhaust gas inlet port 125, the catalytic converter 104, the first cyclonic separator 106, the first fabric filter 112, the second cyclonic separator 108 and the exhaust gas outlet port 138, in that order. Another portion of the exhaust gas from the fire box 102 flows sequentially through the exhaust gas inlet port 125, the catalytic converter 104, the first cyclonic separator 106, the second fabric filter 114, the third cyclonic separator 110 and the exhaust gas outlet port 138, in that order. The fan 142 compensates for exhaust gas flow restriction caused by the fabric filters 112 and 114 and friction caused by "plumbing" in the system 100.

The fan 142 draws exhaust gas from the fire box 102. However, by the time the exhaust gas reaches the fan 142, the exhaust gas is relatively clean of particulate matter.

Consequently, the fan 142 becomes dirtied by the exhaust gas relatively slowly, and certainly much slower than if the fan 142 were located upstream of the cyclonic separators 108, 110 and 106, the fabric filters 112 and 114 or the catalyst 116.

The controller 120 may be programmed to cause the fan motor 140 to operate, cease operating or operate at a speed that depends on parameters sensed by the controller. For example, one or more temperature sensors, pressure sensors and/or flow rate sensors, exemplified by sensor 143, may be disposed within the exhaust gas path to provide parametric data to the controller 120. Although only one sensor 143 is shown in FIG. 1, any number of sensors may be used, including at other locations along the exhaust gas path between the exhaust gas inlet port 125 and the output port 210. A pressure sensor may be used to infer the exhaust gas flow rate. For example, a relatively high pressure implies no or little exhaust gas flow, whereas a relatively low pressure implies a relatively higher exhaust gas flow rate.

As can be seen from FIG. 1, a portion of the exhaust gas flows through the first fabric filter 112 and the second cyclonic separator 108, and another portion of the exhaust gas flows through the second fabric filter 114 and the third cyclonic separator 110.

Fresh air is drawn into an air channel 144 from outside the pollution control system 100 and delivered to the catalytic converter 104 to provide additional oxygen to promote catalytic action. Various components of the pollution control system 100, such as for example the second and third cyclonic separators 108 and 110, may radiate or conduct heat toward the air channel 144. In addition, at least a portion of the air channel 144 may be disposed within the exhaust gas path. Thus, at least a portion of the air channel 144 includes a heat exchanger 146 thermally coupled to the exhaust gas path to extract heat from the exhaust gas. The air channel 144 therefore delivers air from outside the pollution control system 100, heated by the heat exchanger 146, to the catalytic converter 104.

Figure 2:
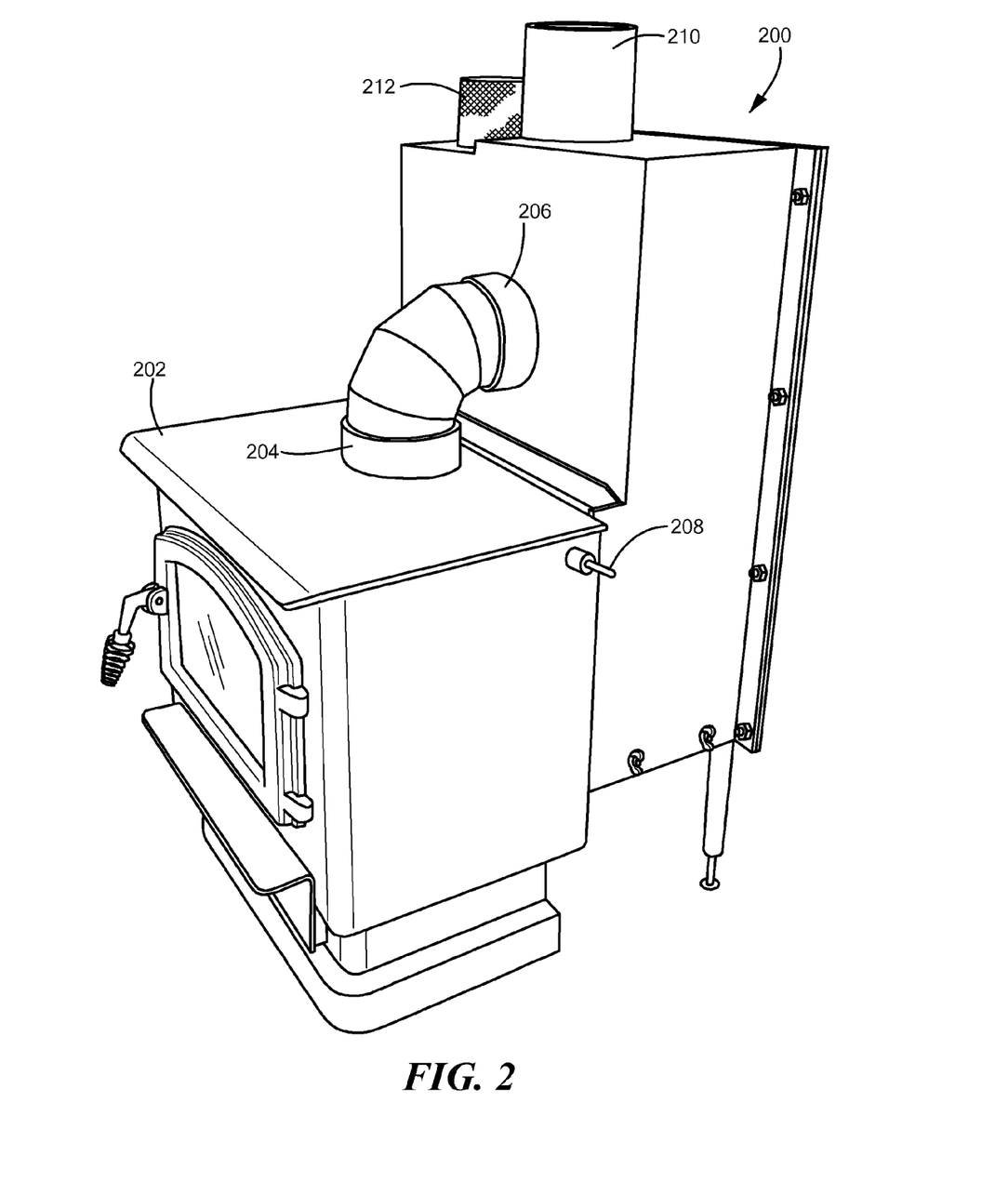
FIG. 2 is a left-rear perspective view of a pollution reduction system, attached to a biomass furnace, according to an embodiment of the present invention.
Figure 3:
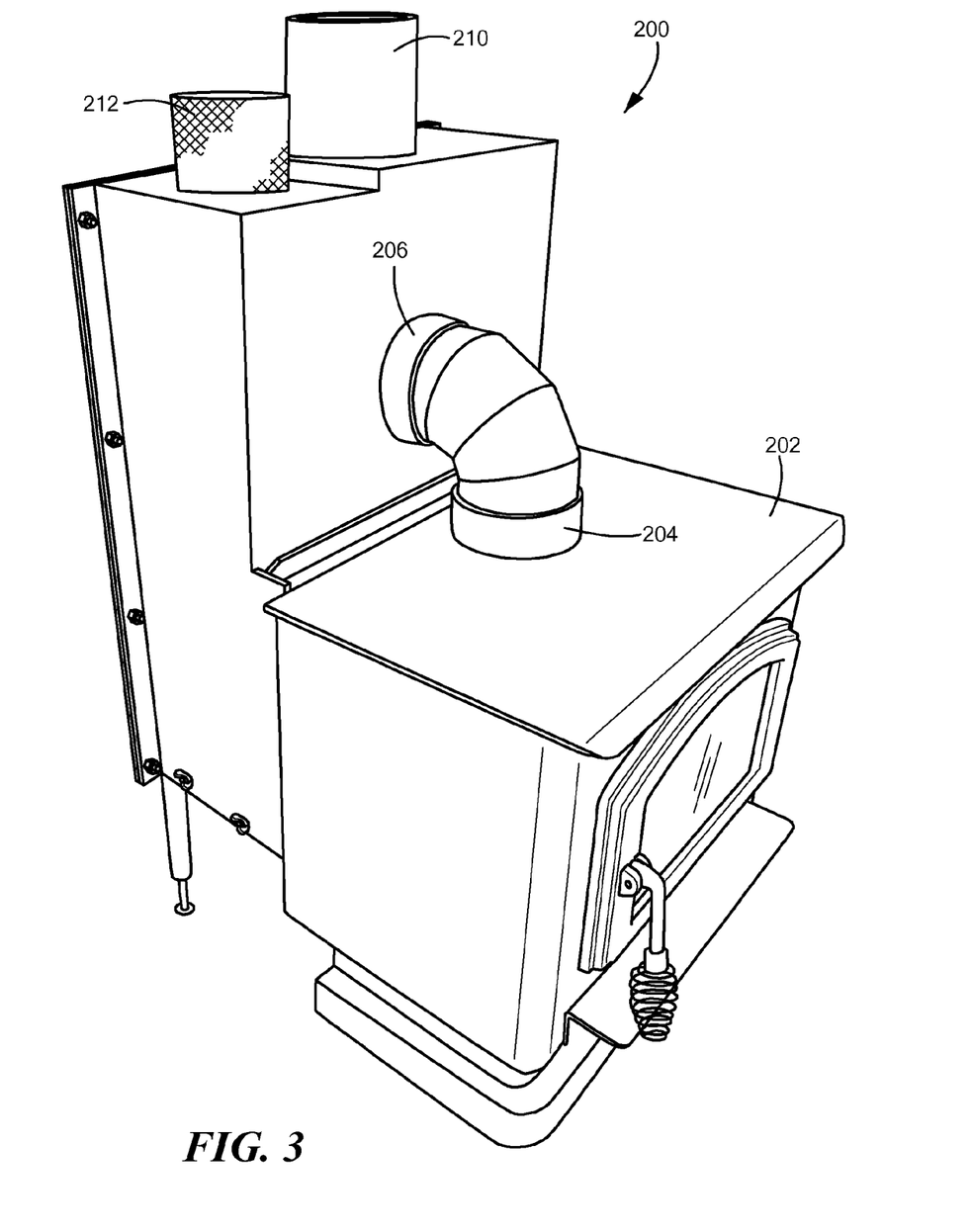
FIG. 3 is a right-rear perspective view of the pollution reduction system of FIG. 2, with the biomass furnace attached.
Figure 4:
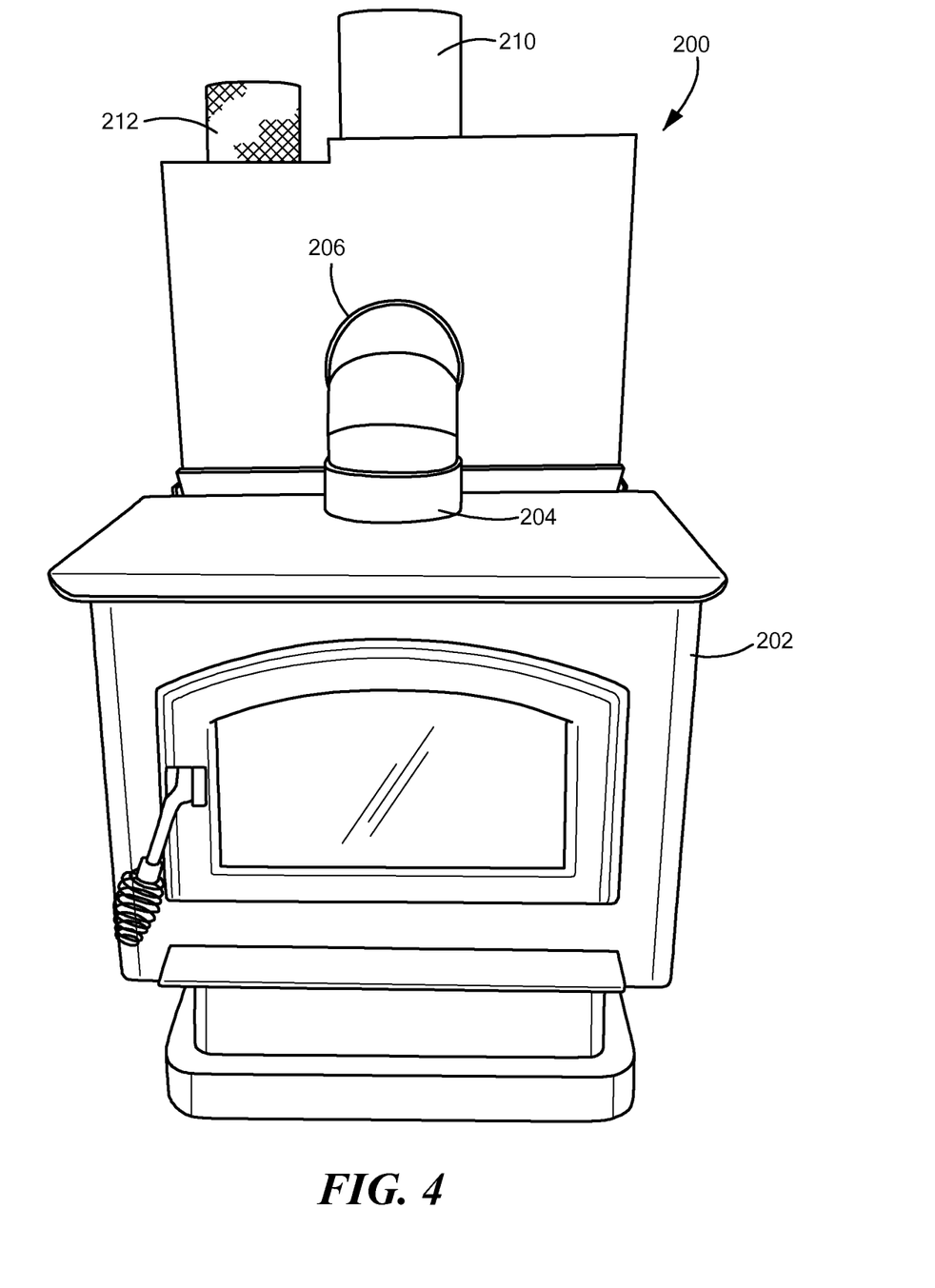
FIG. 4 is a rear view of the pollution reduction system of FIGS. 2 and 3, with the biomass furnace attached.

FIG. 2 is a left-rear perspective view of a pollution reduction system 200, attached to a biomass furnace 202, according to an embodiment of the present invention. An output 204 from the biomass furnace 202 is communicably coupled to an input 206 of the pollution reduction system 200. As used herein, communicably coupled means in fluid communication. Optionally, the biomass furnace 202 may be equipped or retrofitted with a temperature probe 208, and the temperature probe 208 may be coupled to a controller (not visible) of the pollution reduction system 200. An output port 210 of the pollution reduction system 200 and a motor housing 212 are visible in FIG. 2. FIG. 3 is a right-rear perspective view, and FIG. 4 is a rear view, of the pollution reduction system 200.

Figure 5:
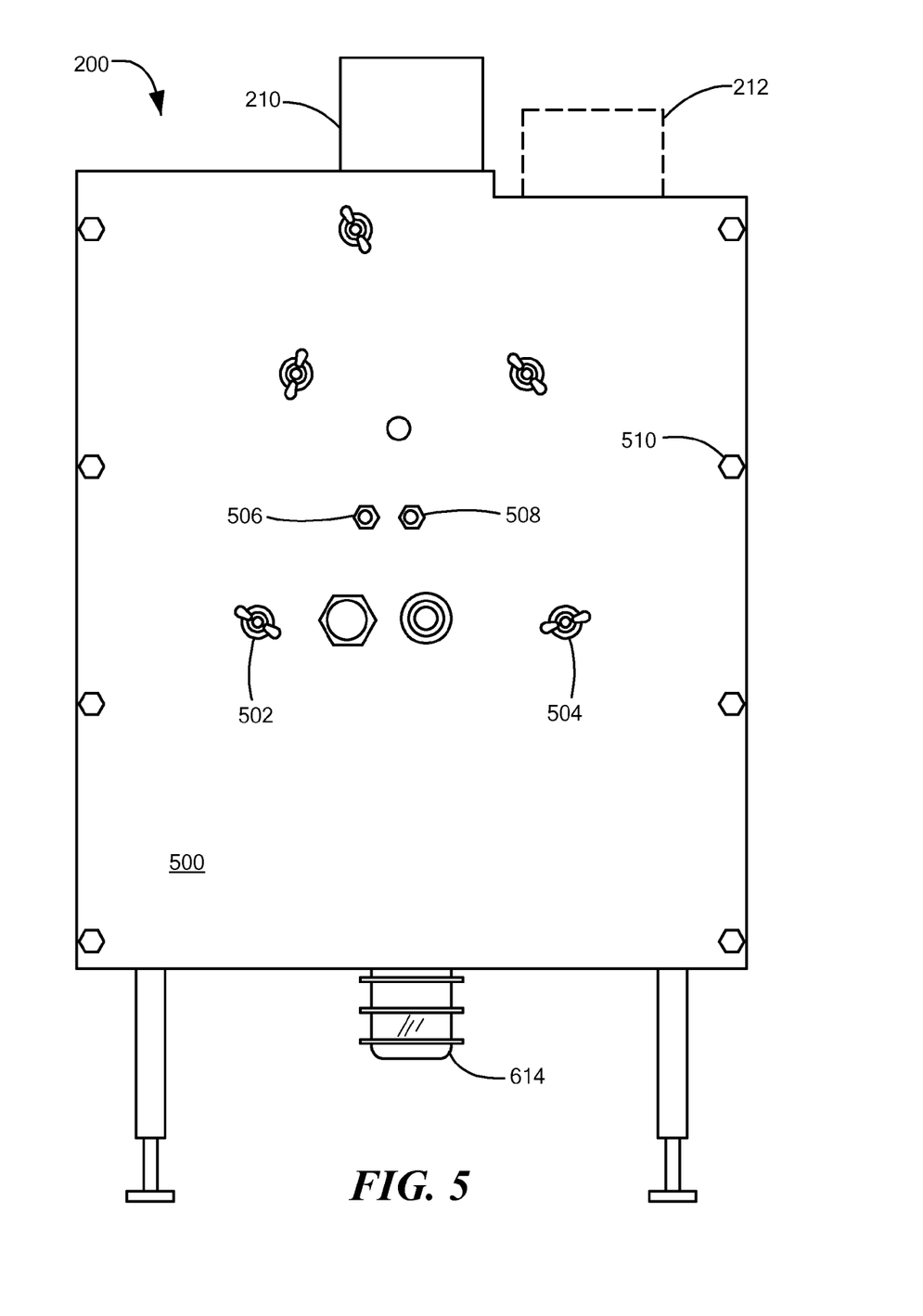
FIG. 5 is a front view of the pollution reduction system of FIGS. 2-4.
Figure 6:
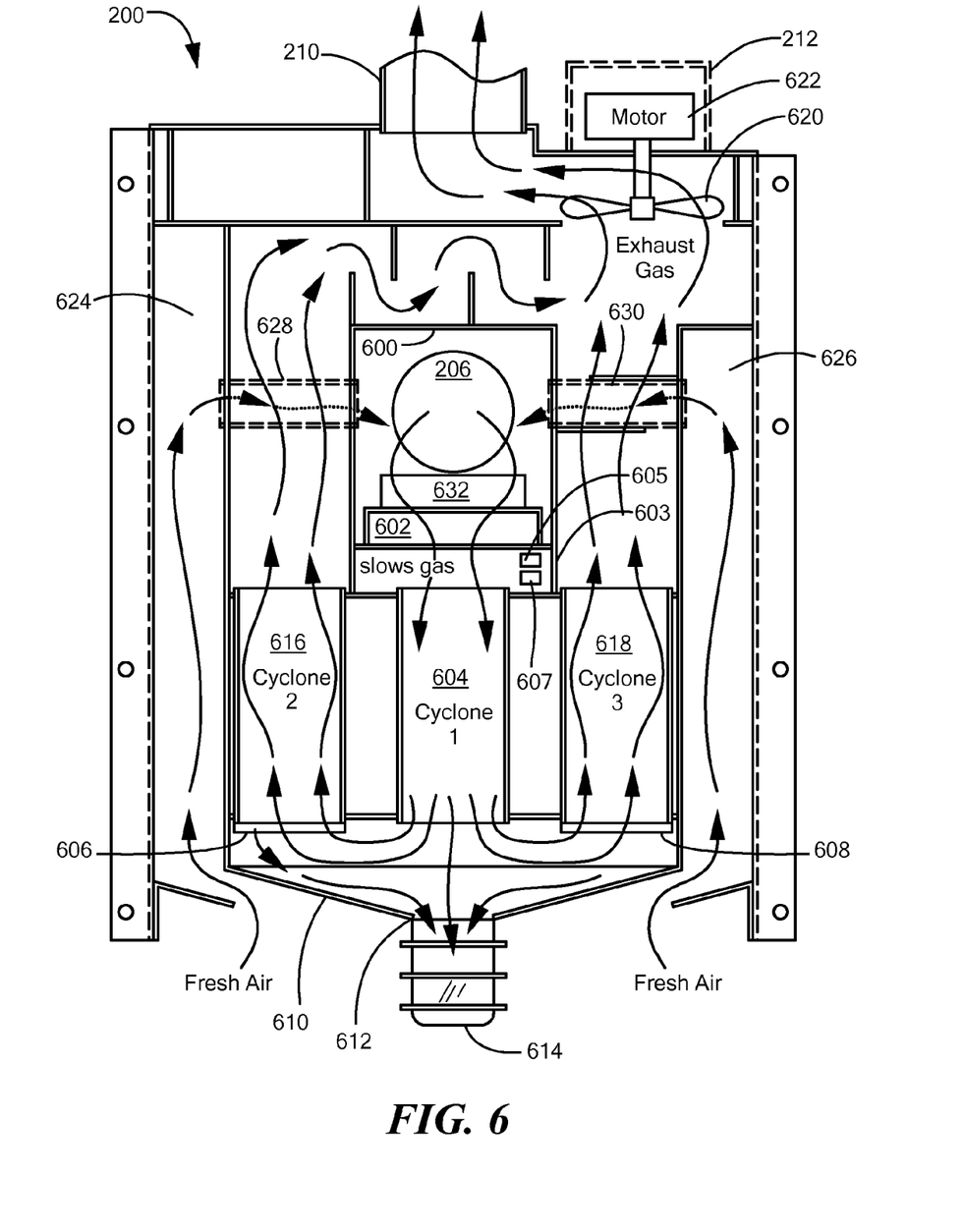
FIG. 6 is a front view of the pollution reduction system of FIGS. 2-5, with a front panel removed to reveal internal components.

FIG. 5 is a front view of the pollution reduction system 200. A front panel 500 of the pollution reduction system 200 may be removed by unfastening several fasteners, exemplified by wingnuts 502, 504, 506, 508 and 510. FIG. 6 is a front view of the pollution reduction system 200, with the front panel 500 removed to reveal internal components of the system 200. The front panel 500 may be removed to service the system 200, such as by replacing the fabric filters and cleaning surfaces of soot.

Exhaust gas from the biomass furnace 202 (not visible) enters the pollution reduction system 200, specifically a catalytic converter chamber 600, via the input port 206. A catalyst 602 is disposed within the catalytic converter chamber 600. The catalyst 602 may include a thin, such as about 0.004 inch thick, ribbon of suitable material, such as stainless steel, to which an appropriate catalyst material has been adhered. The ribbon may be corrugated or formed into a "herringbone" pattern to increase its surface area and wound into a spiral and bound by a band.

The exhaust gas travels down, through the catalyst 602 and enters an expansion chamber 603, which slows the flow of the exhaust gas. An oxygen sensor 605 and/or a temperature sensor 607 may be disposed in the expansion chamber and electronically coupled to the controller (not shown).

The exhaust gas exits the expansion chamber 603 and enters the top of a first cyclonic separator 604. Cleaned exhaust gas exits the bottom of the first catalytic separator 604 and turns about 180 degrees left and right to enter two fabric filters 606 and 608. Some particulate matter cannot negotiate the 180 degree turn in the exhaust gas flow and is, therefore, forced out of the exhaust gas flow and, therefore, falls down.

A particulate matter trough 610 is disposed above a particulate matter receptacle input port 612, below the output of the first cyclonic separator 604 and below the first and second fabric filters 606 and 608. The particulate matter trough 604 defines an input area above the trough 604, and the trough 604 has an output port in communication with the particulate matter receptacle input port 612. An output of the first cyclonic separator 604 registers vertically above a portion of the input area of the trough 604. Similarly, an input of the first fabric filter 606 registers vertically above a portion of the input area of the trough 604, and an input of the second fabric filter 608 registers vertically above another portion of the input area of the trough 604.

The trough 604 slopes downward, from its input area toward its output port. As can be seen in FIG. 6, in some embodiments, the particulate matter trough 604 slopes from two sides toward its middle. The particulate matter trough 610 is shaped to guide particulate matter falling from exhaust gas flow, from the first cyclonic separator 604 and from the first and second fabric filters 606 and 608, toward the particulate matter receptacle input port 612, as indicated by arrows. A suitable particulate matter receptacle 614, such as a user-removable mason jar, is attached to the particulate matter receptacle input port 612.

Exhaust gas exiting the first and second fabric filters 606 and 608 enters second and third respective cyclonic separators 616 and 618. Exhaust gas exiting the second and third cyclonic separators 616 and 618 travels along respective channels that join below a fan 620 driven by a fan motor 622. The exhaust gas is driven by the fan 620 out the exit port 210.

Fresh air is admitted by two air channels 624 and 626 from outside the pollution reduction system 200. Warm steel that defines the air channels 624 and 626 heats the air. The fresh air then passes through heat exchangers 628 and 630, which are heated by exhaust gas exiting the second and third cyclonic separators 616 and 618, respectively, and possibly by conduction or radiation of heat from the cyclonic separators 604, 616 and 618 and radiation or conduction of heat from the catalyst 602. The heat exchangers 628 and 630 further warm the air, and then the warmed air enters the catalytic converter chamber 600 to provide oxygen for the catalyst 602.

Figure 7:
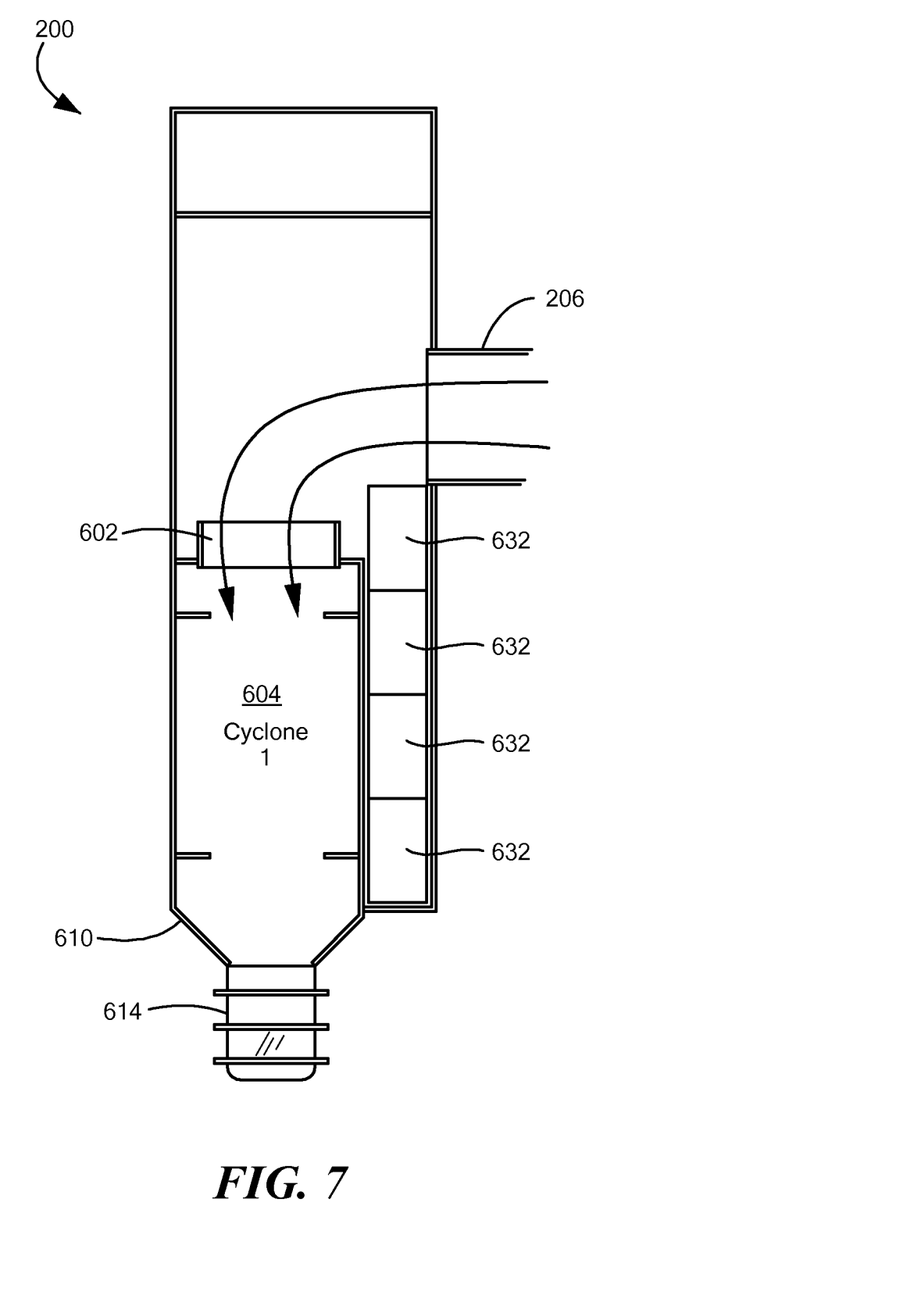
FIG. 7 is a cut-away view of the right side of the pollution reduction system of FIG. 7.

Most or all of the walls of the pollution reduction system 200, such as the front wall 500 (FIG. 5), the walls that define the air channels 624 and 626 and the walls of the catalytic converter chamber 600, the expansion chamber 603, the cyclonic separators 604, 616 and 618, etc., are constructed of appropriate steel or another heat conducting material. These walls conduct and radiate heat. Some of the heat is radiated into the space occupied by the system 200. Some of the heat is radiated or conducted toward a high thermal mass brick 632. FIG. 7 is a cut-away view of the right side of the pollution reduction system 200 showing the high thermal mass brick(s) 632. As can be seen in FIG. 7, several high thermal mass bricks 632 may be stacked parallel to the first cyclonic separator 604 and adjacent the back wall of the pollution reduction system 200. If the back wall of the pollution reduction system 200 is near the biomass furnace 202, heat radiated or conducted from the biomass furnace 202 may be absorbed by the thermal mass bricks 632.

As noted, components, such as the cyclonic separators 604, 616 and 618, the catalytic converter chamber 600 and the walls of the air channels 624 and 626, are made of material and shaped to extract heat from the exhaust gas. Some of the extracted heat is used to warm air to promote catalytic conversion and to warm the catalyst 602. However, much of the extracted heat is delivered to the space in which the pollution reduction system 200 is disposed, such as a room. In some experiments, exhaust gas entering an embodiment of the present invention measured about 500° F. (260° C.), but the exhaust gas exiting the system measured only about 270° F. (132° C.). Thus, the embodiment extracted sufficient heat from the exhaust gas to reduce the exhaust gas temperature by about 230° F. (110° C.), including heat generated by catalytic conversion.

As noted, speed of the fan 620 may be modulated by a controller, such as the controller 120 in FIG. 1, to manage flow rate of the exhaust gas so as to maximize, or at least improve, heat extraction from the exhaust gas, while exhausting gas at a temperature sufficiently high, such as about 213° F. (101° C.), to avoid condensation. For example, if the temperature of the gas exiting the output 210 is less than a predetermined value, such as about 213° F. (101° C.), the controller may increase the speed of the fan 620. Increasing the exhaust gas speed decreases latency time of the exhaust gas within the pollution reduction system 200, thereby decreasing the amount of heat that can be extracted from the exhaust gas. On the other hand, if the temperature of the gas exiting the output 210 is greater than a predetermined value, such as about 250° F. (121° C.), the controller may reduce the speed of the fan 620 or stop the fan 620. Decreasing the exhaust gas speed increases latency time of the exhaust gas within the pollution reduction system 200, thereby increasing the amount of heat that can be extracted from the exhaust gas by the pollution reduction system 200.

Similarly, the controller may use other or additional parameters measured by other sensors to determine an appropriate speed (including stopped) for the fan 620. In some embodiments, a flow rate of the exhaust gas is measured or inferred from signals from one or more sensors, such as a flow rate sensor and/or a pressure sensor, in communication with the exhaust gas path. For example, as noted, a relatively high pressure implies no or little exhaust gas flow, whereas a relatively low pressure, such as due to a relatively high fan speed, implies a relatively higher exhaust gas flow rate.

In some embodiments, oxygen level in the exhaust gas path, such as near the fan 620, is used to determine whether the fan speed should be changed. For example, if the oxygen level is relatively high, such as greater than a predetermined amount, such as about 2% or greater than about 4%, the speed of the fan may be reduced to increase latency time of the exhaust gas within the pollution reduction system 200, thereby providing additional time for combustible products in the exhaust gas to burn. Conversely, if less than a predetermined amount, such as about 2% or less than about 4%, of the exhaust gas contains oxygen, it may be inferred that all practical combustion products in the exhaust gas has burned and, therefore, the speed of the fan may be increased.

Figure 8:
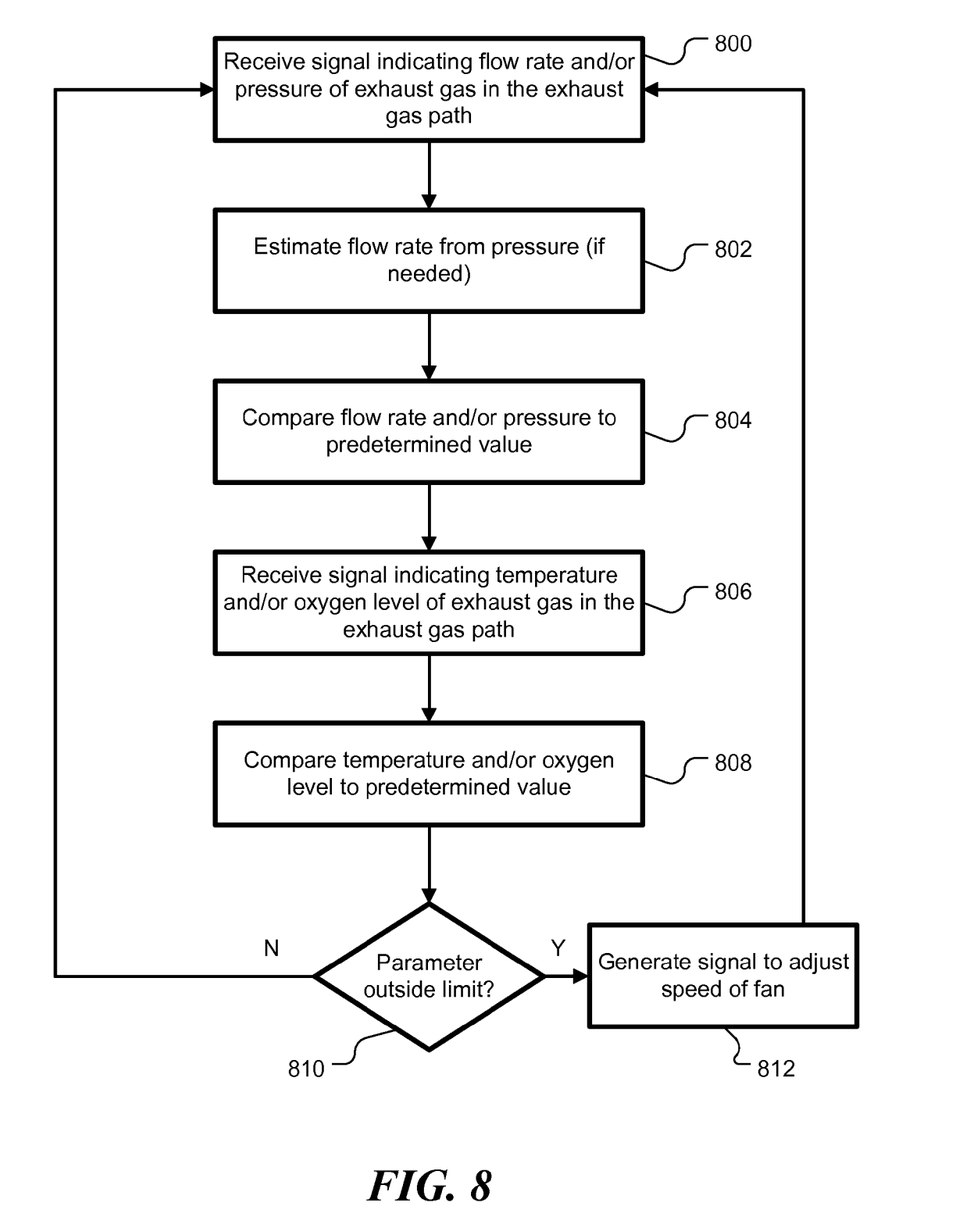
FIG. 8 is a flowchart illustrating operations performed by a controller of FIG. 1, according to an embodiment of the present invention.

FIG. 8 is a flowchart illustrating operations performed by the controller, according to an embodiment of the present invention. The controller measures or estimate parameter and compares the parameters to predetermined values to determine whether to adjust the speed of the fan 620 and, optionally, an extent to which the fan speed should be adjusted. The controller may perform all or some of the operations illustrated in FIG. 8.

At 800, the controller receives a signal from one or more flow rate sensors and/or one or more pressure sensors coupled to the exhaust gas path. At 802, if needed, the controller estimates an exhaust gas flow rate from an exhaust gas pressure. At 804, the controller compares the measured or estimated flow rate, and/or the measured pressure, to respective predetermined values, such as high and low limits.

At 806, the controller receives a signal from one or more temperature sensors and/or one or more oxygen level sensors coupled to the exhaust gas path. At 808, the controller compares the measured values to respective predetermined values, such as high and low limits.

At 810, if a measured or estimated parameter is outside a limit, control passes to 812, where the controller generates a signal to the fan motor 622 to adjust the speed of the fan 620. This may speed up, slow down, start or stop the motor 622. Optionally, at 812, the controller calculates an amount by which to adjust the fan speed, such as according to an amount by which the measured or estimated parameter differs from the limit. At 812, the controller may balance competing factors, such as exhaust gas temperature and oxygen level, in automatically determining an appropriate fan speed.

The controller may be implemented by a processor executing instructions stored in a memory. The processor may receive signals from sensors, such as temperature, flow rate and pressure sensors, and the processor compare temperatures, flow rates, pressures, latency times calculated from the flow rate and known smoke path length, etc. to predetermined values and may generate signals to control operation of a catalyst heater and fan motor, if the measured or calculated values meet criteria established by the predetermined values, as described herein. The controller for the electric catalytic heater and the controller for the fan motor may be separate controllers or they may be implemented by a single processor or circuit.

It should be noted that prior art pollution reduction systems that include cyclonic separation and fabric filtration fail to adequately reduce CO, VOCs and other non-particulate matter emissions. Furthermore, these prior art system quickly become clogged by particulates. The inventive concept disclosed herein, which includes combining a catalytic converter, fabric filtration and plural cyclonic separators, in the order presented, solves the clogging problem, because the catalytic converter combusts a portion of the particulate matter that would otherwise clog subsequent components along the exhaust gas path.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

Although aspects, such as the controller, of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

What is claimed is:

1. A pollution control system for coupling to an exhaust gas outlet port of a biomass furnace, the system comprising:
    an exhaust gas inlet port;
    a catalytic converter communicably coupled to the exhaust gas inlet port;
    an electric heater disposed proximate the catalytic converter;
    a temperature sensor disposed proximate the catalytic converter;
    a controller coupled to the temperature sensor and receiving therefrom a signal indicative of a temperature proximate the catalytic converter, the controller automatically generating a signal that causes operation of the electric heater when the temperature proximate the catalytic converter is less than a predetermined value;
    a first cyclonic separator communicably coupled to an output of the catalytic converter;
    a second cyclonic separator;
    a first fabric filter communicably coupled between an output of the first cyclonic separator and an input of the second cyclonic separator;
    an exhaust gas outlet port communicably coupled to an output of the second cyclonic separator; and
    a motor-driven fan communicably coupled between an output of the second cyclonic separator and the exhaust gas outlet port and causing exhaust gas to flow sequentially, from the exhaust gas inlet port, through the catalytic converter, the first cyclonic separator, the first fabric filter, the second cyclonic separator and the exhaust gas outlet port, in that order, thereby defining an exhaust gas path.

2. A pollution control system according to claim 1, further comprising:
    at least one of: (a) a pressure sensor disposed within the exhaust gas path and (b) a flow rate sensor disposed within the exhaust gas path; and
    a controller coupled to the at least one of the pressure sensor and the flow rate sensor and receiving a first signal therefrom, the controller automatically generating a second signal that controls speed of the motor-driven fan, based at least in part on the first signal.

3. A pollution control system according to claim 1, further comprising an air channel communicably coupled between an outside of the pollution control system and the catalytic converter, the air channel comprising a heat exchanger thermally coupled to the exhaust gas path, the air channel delivering air from outside the pollution control system, heated by the heat exchanger, to the catalytic converter.

4. A pollution control system according to claim 1, further comprising at least one thermal mass brick proximate, and thermally coupled to, the catalytic converter and the first cyclonic separator, the at least one thermal mass brick being positioned to absorb heat from the first cyclonic separator, store the heat and at least one of (a) radiate the stored heat toward the catalytic converter and (b) conduct the stored heat toward the catalytic converter.

5. A pollution control system according to claim 4, wherein the at least one thermal mass brick comprises at least three thermal mass bricks stacked vertically parallel to the first cyclonic separator.

6. A pollution control system according to claim 1, further comprising:
    a user-removable particulate matter receptacle having an input port; and
    a trough having an output port and defining an input area, the trough sloping downward from the input area toward the output port, an input of the first fabric filter and the output of the first cyclonic separator each registering vertically above at least a respective portion of the input area, the output port of the trough being in communication with the input port of the particulate matter receptacle.

7. A pollution control system according to claim 6, wherein the first cyclonic separator is oriented substantially parallel to the second cyclonic separator, and an input of the second cyclonic separator is positioned proximate the output of the first cyclonic separator, such that the exhaust gas flows through the first cyclonic separator in a direction substantially opposite a direction the exhaust gas flows through the second cyclonic separator, thereby requiring the exhaust gas to turn about 180 degrees after exiting the first cyclonic separator to enter the first fabric filter.

8. A pollution control system according to claim 1, further comprising:
    a third cyclonic separator;
    a second fabric filter communicably coupled between the output of the first cyclonic separator and an input of the third cyclonic separator; wherein:
    the exhaust gas outlet port is communicably coupled to an output of the third cyclonic separator, as well as to the output of the second cyclonic separator;
    at least a portion of the exhaust gas path includes the second fabric filter and the third cyclonic separator; and
    the motor-driven fan causes at least a portion of the exhaust gas to flow sequentially through the second fabric filter and the third cyclonic separator, in that order.

9. A pollution control system according to claim 8, further comprising:
    a user-removable particulate matter receptacle having an input port; and
    a trough having an output port and defining an input area, the trough sloping downward from the input area toward the output port, an input of the first fabric filter, an input of the second fabric filter and the output of the first cyclonic separator each registering vertically above at least a respective portion of the input area, the output port of the trough being in communication with the input port of the particulate matter receptacle.

10. A pollution control system according to claim 9, wherein the first cyclonic separator is oriented substantially parallel to the second cyclonic separator and substantially parallel to the third cyclonic separator, an input of the second cyclonic separator and an input of the third cyclonic separator are each positioned proximate the output of the first cyclonic separator, such that the exhaust gas flows through the first cyclonic separator in a direction substantially opposite a direction the exhaust gas flows through the second and third cyclonic separators, thereby requiring at least a portion of the exhaust gas to turn about 180 degrees after exiting the first cyclonic separator to enter the first fabric filter and requiring another at least a portion of the exhaust gas to turn about 180 degrees after exiting the first cyclonic separator to enter the second fabric filter.

* * * * *